UNITED STATES PATENT OFFICE.

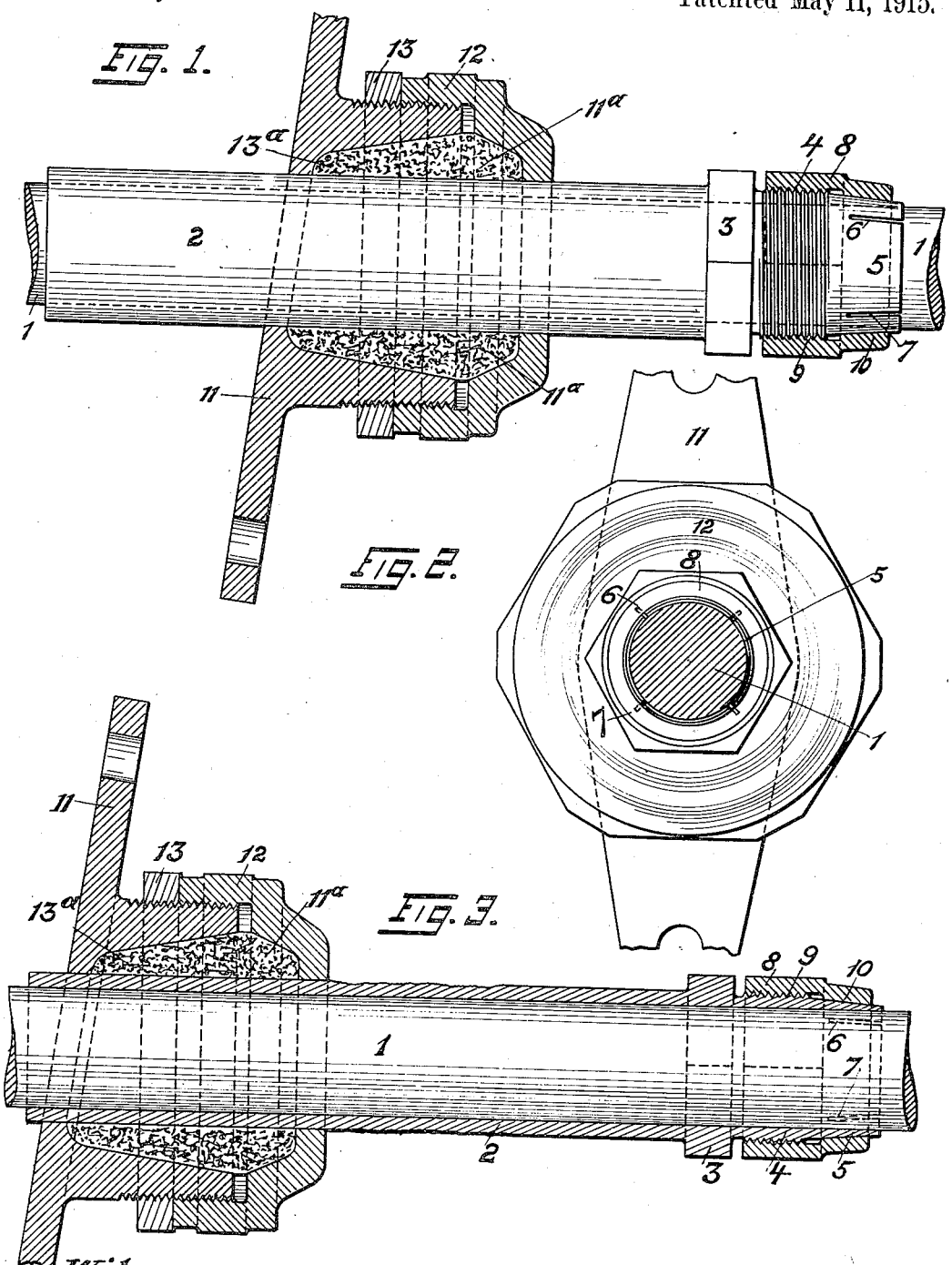

HOWARD HOFFMAN, OF BELMAR, NEW JERSEY.

RENEWABLE SLEEVE FOR ROTATABLE SHAFTS.

1,139,120.   Specification of Letters Patent.   Patented May 11, 1915.

Application filed August 5, 1914. Serial No. 855,109.

*To all whom it may concern:*

Be it known that I, HOWARD HOFFMAN, a citizen of the United States, residing in Belmar, in the county of Monmouth and State of New Jersey, have invented certain new and useful Improvements in Renewable Sleeves for Rotatable Shafts, of which the following is a specification.

My present invention relates to an improvement in renewable sleeves for shafting as applied to vessels of the motor boat class. Its use may also be so extended as to include other types of power driven vessels and also to rotating shafting of all kinds, where the wear of the shaft and the consequent reduction of cross sectional area is greater than under ordinary use. As is well known in the above noted class of vessels it is customary to have the propeller shaft of Tobin bronze or other non-corrodible material and at the stern of the vessel where the propeller leaves the boat and enters the water there is arranged a metallic bearing for the shaft, which bearing also performs the function of a stuffing box for preventing leakage of the water into the boat.

In stuffing boxes of the usual type a packing nut is used forcing the packing against the bronze shaft, in order to make a water tight fit, and the shaft after a while becomes badly grooved or worn from the pressure of the packing thereon, thereby permitting water to enter through this leaky connection. Fresh packing may be inserted into the stuffing box and compressed against the worn shaft to tighten the bearing, until the grooves finally become so deep in the propeller shaft that it is ruined and practically becomes useless, because the shaft is weakened in cross sectional area and the stuffing box cannot be kept tight. Owing to the deep grooves and the inability to keep the joint tight at the worn portion, the shaft must be replaced by a new one which makes the remedy for a leaky propeller shaft expensive.

In order to economically overcome the difficulties involved in keeping a tight propeller shaft connection and to save the costly renewals of the shaft, I have designed a renewable sleeve which is locked upon the propeller shaft, and rotates therewith, in such a manner that it may be shifted from time to time so as to locate the worn place on the sleeve outside of the stuffing box and to bring into the stuffing box a new unworn surface and if the sleeve becomes too badly grooved for further use it may be readily discarded and replaced by a new one. It is obvious that this method of renewal of the rotative surface of the shaft is a great and desirable economy.

In the accompanying drawings, Figure 1 is a sectional view of my device. Fig. 2 is an end view thereof and Fig. 3 is another sectional view showing the sleeve in another position.

By referring to the accompanying drawings, it will be noted that the propeller shaft 1 has mounted thereon a sleeve 2, which sleeve 2 has an integral hexagonal portion 3 thereon for manipulation with a wrench, and adjacent to the same is a cylindrical threaded portion 4 which is formed into a tapered end 5. The tapered end 5 is slotted in a plurality of places as indicated at 6 and 7, this slotting being for the purpose of rendering the end connection 5 flexible. A lock nut 8 having a threaded portion 9 and a tapered seat portion 10 is arranged to be screwed up upon the thread and tapered end of the sleeve in such a manner as to compress the tapered end 5 and cause it to frictionally engage the propeller shaft 1. This causes the sleeve to become substantially a portion of the shaft and to rotate therewith.

The stuffing box here shown is of the well known standard type and comprises a flanged and threaded bushing portion 11 having a packing chamber 11$^a$ and a packing nut 12 screwed thereon and a lock nut 13 to lock said packing nut in any required position. Packing 13$^a$ is shown in the chamber 11$^a$.

In practice, the use of my device renders it necessary to use a size larger standard stuffing box than is customarily used; for instance, if a one inch bronze shaft is used the renewable sleeve member may be one and one-fourth inches outside diameter thereby making the walls of the renewable sleeve about one-eighth inch thick. Therefore a one and one-fourth inch standard bushing will be required for a one inch shaft. If, after a sleeve has been once properly set and the packing compressed to exclude the water, and during use, a slight leakage occurs, this may be taken up in the usual manner by screwing up the packing nut 12 to further compress the packing 13$^a$. This compression may be increased from time to time until the sleeve becomes so deeply scored that further compression is no longer useful. The lock nut 8 may be then loosened and the sleeve 1 shifted along the shaft so as to bring a new ungrooved surface into the stuffing box, and, possibly a new packing placed therein, and after tightening of the packing a new non-leaking joint is made. This operation may be repeated any predetermined number of times providing the sleeve is made long enough to permit a number of such shifts of the sleeve until the sleeve is replaced by a new one.

It is obvious from the foregoing that aside from the advantages obtained as above noted that the strength of the propeller shaft 1 is greatly accentuated by the enveloping sleeve 2 against bending. A motorboat may sometimes be driven in shallow water or against some other submerged obstacle and the propeller coming in contact with such obstacles will force the shaft upwardly and bend the same close to the stuffing box. My device gives greater strength and elasticity at this critical point and is an aid to overcoming the foregoing noted disadvantages.

Having thus described my invention, I claim:

1. A shiftable sleeve for shafts comprising a cylindrical portion, a wrench receiving portion, a threaded cylindrical portion, and a tapered portion slotted to permit of frictional engagement with a shaft.

2. A shiftable removable bearing sleeve for shafts comprising a cylindrical portion, a wrench receiving portion, a threaded cylindrical portion, a slotted tapered portion, and a taper chambered nut having a cylindrical threaded portion adapted to engage said threaded and tapered portions of said sleeve thereby to permit frictional engagement between said sleeve and a shaft.

3. A shiftable removable bearing sleeve for shafts comprising a cylindrical portion, a slotted tapered portion at one end thereof, and a cylindrical threaded portion adjacent to said slotted tapered portion; and a nut having a cylindrical threaded portion to engage the cylindrical threaded portion of said sleeve, and a taper chambered portion to simultaneously engage the slotted tapered portion of said sleeve thereby to permit frictional engagement between said sleeve and a shaft.

4. The combination with a stuffing box, of a shiftable shaft protecting sleeve on said shaft and in said stuffing box, and shaft engaging means carried by said sleeve to permit its rigid engagement in any adjusted position on a shaft, the sleeve being axially shiftable so as to replace a worn surface of said sleeve in said stuffing box by a fresh surface.

5. The combination with a stuffing box and a shaft, of a shiftable sleeve therebetween, one end of said sleeve being threaded and having a slotted tapering portion and a taper seated lock nut for said end, whereby said sleeve may be locked, unlocked and moved relative to said stuffing box and shaft to replace a worn by an unworn surface.

6. The combination with a stuffing box and a shaft extending therethrough, of a shiftable sleeve mounted on said shaft and interposed between said stuffing box and shaft, and means for locking said sleeve on said shaft.

7. The combination with a stuffing box and a shaft extending therethrough, of an elongated sleeve mounted on said shaft and interposed between said stuffing box and said shaft, and means for locking said sleeve to rotate with said shaft, said sleeve being shiftable between said shaft and stuffing box when the locking means are released so as to replace a worn surface of said sleeve in said stuffing box by a fresh surface.

8. The combination with a stuffing box and a shaft, of an elongated sleeve mounted on said shaft and interposed between said stuffing box and said shaft to receive the wear caused by the rotation of said shaft in said stuffing box, said sleeve being axially shiftable so as to replace a worn surface of said sleeve in said stuffing box by a fresh surface.

9. In a device of the character described, a stuffing box, a shaft rotatably mounted in said stuffing box but fixed in its axial movement relative to said stuffing box, and a sleeve mounted on said shaft and interposed between said stuffing box and said shaft to receive the wear caused by the rotation of said shaft in said stuffing box, said sleeve being axially shiftable so as to replace a worn surface of said sleeve in said stuffing box by a fresh surface.

10. In a device of the character described, a stuffing box, a shaft rotatably mounted in said stuffing box but fixed in its axial movement relative to said stuffing box, a sleeve mounted on said shaft and interposed between said stuffing box and said shaft to receive the wear caused by the rotation of said shaft in said stuffing box, said sleeve being axially shiftable so as to replace a worn surface of said sleeve in said stuffing box by a fresh surface, and means for locking said sleeve in position on said shaft against axial displacement.

HOWARD HOFFMAN.

Witnesses:
H. D. PENNEY,
J. F. V. CHRISTOPHER.